No. 852,059. PATENTED APR. 30, 1907.
J. W. GARDNER.
GIRTH.
APPLICATION FILED MAR. 30, 1906.

WITNESSES:

INVENTOR
J. W. Gardner

By W. J. Fitzgerald
Attorneys

UNITED STATES PATENT OFFICE.

JAMES WILLIAM GARDNER, OF JARRATT, VIRGINIA.

GIRTH.

No. 852,059.   Specification of Letters Patent.   Patented April 30, 1907.

Application filed March 30, 1906. Serial No. 308,971.

*To all whom it may concern:*

Be it known that I, JAMES WILLIAM GARDNER, a citizen of the United States, residing at Jarratt, in the county of Sussex and State of Virginia, have invented certain new and useful Improvements in Girths; and I do hereby declare the following to be a full, clear, and exact description of the invention, such as will enable others skilled in the art to which it appertains to make and use the same.

My invention relates to new and useful improvements in girths and my object is to provide a device of this class adapted to be used in connection with harness and one that is adapted to hold the traces from the sides of the draft animals.

A further object is to provide a girth which can be quickly secured to or removed from the harness.

A further object is to provide adjusting means for said girth whereby it may be made to fit different sized animals.

Other objects and advantages will be hereinafter made clearly apparent and pointed out in the claims.

In the accompanying drawings which are made a part of this application, I have shown the preferred form of my invention.

Figure 1:
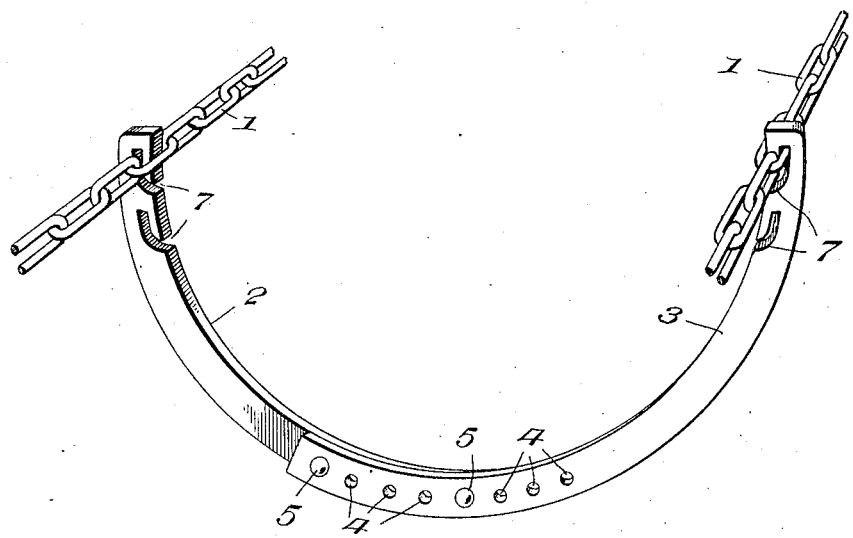
Figure 2:
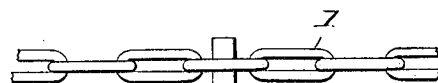

In said drawings—Figure 1 is a perspective view showing my improved girth secured in position upon a section of a harness. Fig. 2 is a central, vertical, sectional view thereof, and, Fig. 3 is a detail elevation showing my device as applied to a different form of trace from that shown in Figs. 1 and 2.

Referring to the drawings, in which similar reference numerals designate corresponding parts throughout the several views, 1 indicates the traces of a harness which may be of any preferred construction, while 2 and 3 indicate the two sections of my improved girth, the meeting ends of each of said sections being provided with a plurality of registering openings 4 through which is inserted one or more locking bolts 5 and by which means said sections 2 and 3 are adjustably secured together. The upper ends of each of the members 2 and 3 are provided with ways 6, said ways being directed inwardly and upwardly from the inner edge of said members 2 and 3, the lower ends 7 of said ways being curved inwardly and intersecting said inner edges.

In applying my improved girth to use the same is placed below the animal and the traces 1 entered into the ways 6, thereby securing said girth to the harness and as said girth is preferably constructed of metal, said traces will be held in their adjusted position. It will therefore be seen that when the sections 2 and 3 are properly adjusted and secured to the traces 1, said traces will be held from contact with the body of the animal and it will also be seen that said girth will prevent the traces from moving upwardly along the sides of the animal when the line of draft upon the traces is above their normal position.

Figure 3:
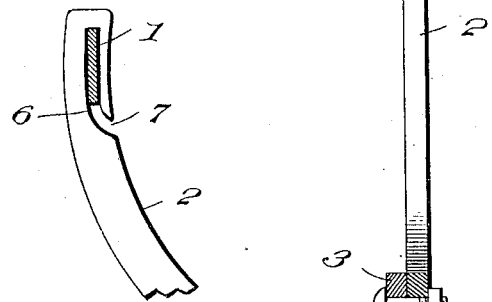

In Figs. 1 and 2 of the drawings I have shown my improved girth as applied to chain traces while in Fig. 3 I have shown one end of said device as secured to a leather or flat trace, it being clearly understood that the girth may be attached to any preferred form of trace. It will also be readily understood that by providing the meeting ends of the members 2 and 3 with registering openings said girth may be made larger or smaller as desired to conform to the different sized animals upon which it may be used.

What I claim is:—

1. In a trace holder, a curved frame in two sections, the meeting ends of said sections adapted to overlap each other, means to adjustably secure the overlapped ends of said sections together, the free ends of said sections having curved ways therein to receive the traces.

2. The herein described holder for harness traces; comprising a girth made in sections the meeting ends of which are adapted to overlap each other, means to adjustably secure said sections together, each of said sections having curved ways at its upper end to receive the traces.

3. A holder for harness traces; comprising a girth made in sections, and having a plurality of registering openings in the meeting ends thereof, means to engage said registering openings and adjustably secure said ends together, the upper ends of said sections being provided with ways having curved outlets whereby the traces may be disposed in said ways.

4. A holder for harness traces, comprising a girth made in sections, said sections having ways directed inwardly from one edge thereof to receive said traces, and means to adjustably secure said sections together.

5. A trace holder, comprising a girth made in sections, the meeting ends of said sections overlapping each other and having a plurality of registering openings therethrough, means to engage said openings and adjustably secure said sections together, each of said sections having a plurality of ways at its upper end to receive the traces, said ways being directed inwardly from the inner edges of said sections.

In testimony whereof I have signed my name to this specification in the presence of two subscribing witnesses.

JAMES WILLIAM GARDNER.

Witnesses:
G. W. JOHNSTON,
W. H. BURGAR.